(12) United States Patent
Lundstrom

(10) Patent No.: US 9,916,231 B2
(45) Date of Patent: Mar. 13, 2018

(54) MODULAR PLUG-AND-PLAY SYSTEM FOR CONTINUOUS MODEL DRIVEN TESTING

(71) Applicant: Magine Holding AB, Stockholm (SE)

(72) Inventor: Johan Lundstrom, Solna (SE)

(73) Assignee: MAGINE HOLDING AB, Stockholm (SE)

( * ) Notice: Subject to any disclaimer, the term of this patent is extended or adjusted under 35 U.S.C. 154(b) by 13 days.

(21) Appl. No.: 14/802,621

(22) Filed: Jul. 17, 2015

(65) Prior Publication Data
US 2017/0017566 A1    Jan. 19, 2017

(51) Int. Cl.
G06F 11/00    (2006.01)
G06F 11/36    (2006.01)

(52) U.S. Cl.
CPC ...... *G06F 11/3688* (2013.01); *G06F 11/3672* (2013.01); *G06F 11/3684* (2013.01)

(58) Field of Classification Search
CPC .............. G06F 11/3684; G06F 11/263; G06F 11/3672; G06F 3/0484; G06F 11/3688; G06F 11/3664; H04L 65/608; H04L 43/50; H04L 67/14; H04W 24/06
See application file for complete search history.

(56) References Cited

U.S. PATENT DOCUMENTS

| | | | | |
|---|---|---|---|---|
| 5,675,800 A * | 10/1997 | Fisher, Jr. | ............. | G06F 15/177 709/208 |
| 5,684,807 A * | 11/1997 | Bianchini, Jr. | ......... | H04L 43/50 714/4.2 |
| 5,862,362 A * | 1/1999 | Somasegar | ......... | G06F 11/3664 703/21 |
| 5,928,363 A * | 7/1999 | Ruvolo | .................... | G06F 21/31 713/155 |
| 8,046,639 B1 * | 10/2011 | Nordin | ................ | G06F 11/2268 714/32 |
| 9,052,941 B1 * | 6/2015 | Bone | .......................... | G06F 9/46 |
| 9,232,420 B1 * | 1/2016 | Akiti | ..................... | H04W 24/06 |
| 9,449,525 B2 * | 9/2016 | Timbadia | ................ | H04L 43/00 |
| 2008/0209045 A1 * | 8/2008 | Rothstein | ................ | H04L 29/06 709/227 |
| 2013/0039275 A1 * | 2/2013 | Patil | ...................... | H04W 48/20 370/328 |
| 2013/0219194 A1 * | 8/2013 | Gong | .................... | G06F 11/261 713/300 |

(Continued)

*Primary Examiner* — Loan L. T. Truong
(74) *Attorney, Agent, or Firm* — Dentons US LLP

(57) ABSTRACT

A method for testing an application running on an electronic device includes parsing, by a test processor, a state model of the application representing relationships among a plurality nodes, each node representing an application state. The method further includes parsing, by the test processor, a test implementation file including a plurality of commands for manipulating at least one of the application and the electronic device, each of the plurality of commands associated with respective ones of the plurality of nodes, traversing, by the test processor, the state model of the application by selecting for testing an application node in accordance with the node relationships in the state model. The method also includes selecting, by the test processor, one or more of the plurality of commands for testing the application based on at least one criteria, and executing, by the test processor, the one or more selected commands.

16 Claims, 6 Drawing Sheets

(56) References Cited

U.S. PATENT DOCUMENTS

| | | | | |
|---|---|---|---|---|
| 2014/0089875 A1* | 3/2014 | Arora | G06F 17/505 | 716/112 |
| 2014/0143609 A1* | 5/2014 | Foote | G06F 11/3409 | 714/47.1 |
| 2014/0157288 A1* | 6/2014 | Wong | G06F 11/3476 | 719/318 |
| 2014/0237451 A1* | 8/2014 | Koneru | G06F 11/3688 | 717/124 |
| 2014/0250251 A1* | 9/2014 | Marks | G06F 9/445 | 710/267 |
| 2014/0280904 A1* | 9/2014 | Bugenhagen | H04L 43/50 | 709/224 |
| 2014/0310690 A1* | 10/2014 | Yang | G06F 11/3684 | 717/124 |
| 2014/0310693 A1* | 10/2014 | Elston | G06F 11/22 | 717/129 |
| 2014/0365198 A1* | 12/2014 | Kuell | G06F 17/5009 | 703/17 |
| 2015/0006724 A1* | 1/2015 | Amidei | H04L 67/34 | 709/225 |
| 2015/0007138 A1* | 1/2015 | Sabetta | G06F 11/3684 | 717/124 |
| 2015/0025818 A1* | 1/2015 | Das | H04W 24/10 | 702/58 |
| 2015/0072332 A1* | 3/2015 | Lin | G06Q 30/0202 | 434/322 |
| 2015/0086194 A1* | 3/2015 | Kassler | H04B 10/0773 | 398/28 |
| 2015/0227294 A1* | 8/2015 | Talvensaari | H04L 65/4084 | 715/717 |
| 2015/0236942 A1* | 8/2015 | Carter | H04L 43/50 | 709/213 |
| 2015/0301108 A1* | 10/2015 | Hamid | G01R 31/3177 | 714/724 |
| 2015/0339216 A1* | 11/2015 | Wade | G06F 11/3688 | 714/38.1 |
| 2016/0044520 A1* | 2/2016 | Iyer | H04W 24/08 | 370/252 |
| 2016/0110212 A1* | 4/2016 | Karnes | G06F 9/45558 | 718/1 |
| 2016/0150427 A1* | 5/2016 | Ramanath | H04W 24/06 | 370/252 |
| 2016/0164761 A1* | 6/2016 | Sathyanarayana | H04L 43/0876 | 709/219 |
| 2016/0165227 A1* | 6/2016 | Babbar | H04L 43/0847 | 348/181 |
| 2016/0188450 A1* | 6/2016 | Appusamy | G06F 11/3664 | 714/38.1 |
| 2016/0277491 A1* | 9/2016 | El-Beltagy | H04L 41/08 | |
| 2016/0283356 A1* | 9/2016 | Waldman | G06F 11/3664 | |
| 2016/0364319 A1* | 12/2016 | Che | G06F 11/362 | |

* cited by examiner

MODULAR PLUG-AND-PLAY SYSTEM FOR CONTINUOUS MODEL DRIVEN TESTING

TECHNICAL FIELD

The field of the invention is generally related to software optimization, and in particular to automated software testing.

BACKGROUND

In todays software industry there is a constant struggle between time, money and quality. You can never ship soon enough. To mitigate this problem many have started to write automated software tests, which test for software errors in response to various inputs. The most natural approach to this was to write linear, static test cases, collect these test cases into test suits, and then run these software test suits. As the tests are executed, the test results are collected for analysis.

The linear tests take a long time to run and they are usually only run toward the end of the development cycle. These linear tests are also expensive in terms of development costs. Additionally, their linear static nature results in testing the same paths through the software under test time after time. In other words, such linear tests always do the same thing, in the same order and can only do exactly what the test developer has programmed them to do. This also puts a lot of stress on the test developer because he or she needs to come up with numerous different combinations of inputs to the software (called test case design) in order to maximize the likelihood of identifying potential errors. However, nontrivial software often has so many combinations of input that it becomes impossible to cover them all or to even pick the most important combinations, which diminishes the quality of test case design. Additionally, conventional tests only run during a test phase, during which time the hardware on which the software under test runs can not be used for other purposes. Conventional software testing also delivers results too late in the development cycle. Finally, one change in the software under test requires many linear static test cases to be updated, which complicates test case maintenance and may result in many false positives.

SUMMARY

In one embodiment, a method for testing an application running on an electronic device is provided. The method includes parsing, by a test processor, a state model of the application representing relationships among a plurality nodes, each node representing an application state. The method further includes parsing, by the test processor, a test implementation file including a plurality of commands for manipulating at least one of the application and the electronic device, each of the plurality of commands associated with respective ones of the plurality of nodes. The method further includes traversing, by the test processor, the state model of the application by selecting for testing an application node in accordance with the node relationships in the state model. The method also includes selecting, by the test processor, one or more of the plurality of commands for testing the application based on at least one criteria, and executing, by the test processor, the one or more selected commands.

In another embodiment, an apparatus for testing an application running on an electronic device is provided. The apparatus comprises a test processor and memory, coupled to the test processor and having computer readable instructions executed by the test processor. The instructions include parsing, by the test processor, a state model of the application representing relationships among a plurality nodes, each node representing an application state, parsing, by the test processor, a test implementation file including a plurality of commands for manipulating at least one of the application and the electronic device, each of the plurality of commands associated with respective ones of the plurality of nodes. The instructions further include traversing, by the test processor, the state model of the application by selecting for testing an application node in accordance with the node relationships in the state model, as well as selecting, by the test processor, one or more of the plurality of commands for testing the application based on at least one criteria. The instructions additionally include executing, by the test processor, the one or more selected commands.

In various embodiments, the at least one criteria is at least one of a random selection and a weight assigned to the one or more of the plurality of commands. Additionally, the test processor may detect that a connection session with the electronic device was terminated and resume traversing of the state model of the application. The traversing of the state model of the application may be from one of a predetermined application node and an application node for which the one or more selected commands were executing prior to the detection. In various embodiments, the electronic device is selected from the group consisting of a mobile device, a mobile phone, a tablet computer, a computer, a set top box, and a television. Additionally, the application may be a video streaming interface. Further embodiments of the present disclosure include generating a heat map graphical representation of application errors for each node in the state model. Additionally the test processor of the present disclosure may assign a priority to an error based on maintaining a log of known errors. In embodiments, the electronic device is connected to the test processor via one of a wired connection and a wireless connection.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
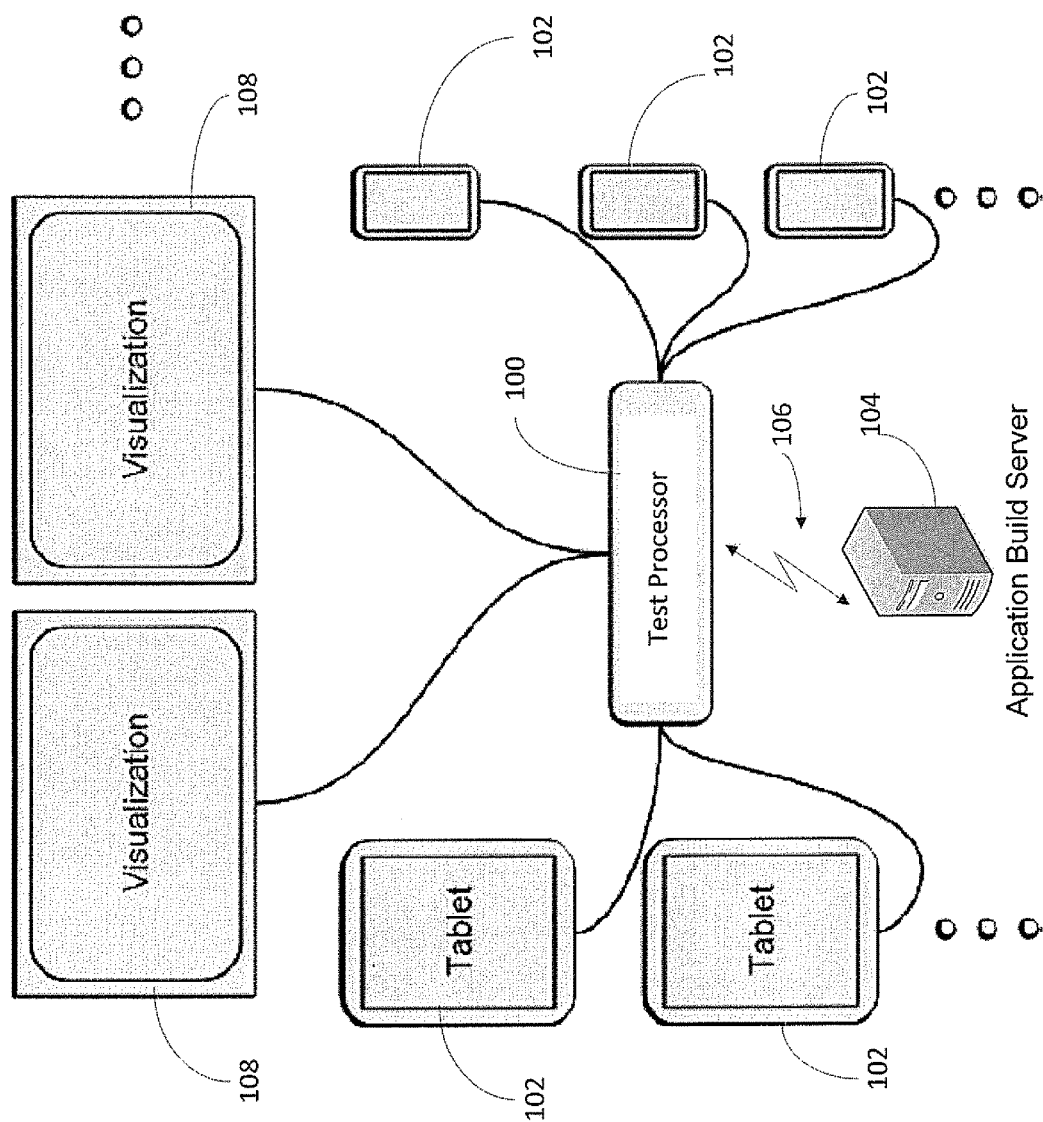
FIG. 1 is a diagram illustrating an embodiment of a system for modular continuous plug-and-play model driven software testing.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. One skilled in the art recognizes that numerous alternative components and embodiments may be substituted for the particular examples described herein and still fall within the scope of the invention.

Embodiments of the present disclosure provide a new approach to automated software testing where, instead of running at the end of development cycle, tests are performed on a continuous and modular basis. Model driven tests are employed where no test run is the same as the last test run. In particular, a graph of application states is traversed by the test processor of the present disclosure, where the state graph represents relationships among a plurality of application nodes. In one embodiment, the test processor randomly selects commands, associated with each application state, where the commands manipulate the application and/or an electronic device on which it runs. Therefore, a single test case can be employed to generate numerous test scenarios. Since the testing is performed continuously, accumulated application error data is used to implement a data driven approach to application testing. Statistical analysis is performed with respect to when, where, and how the application fails or generates errors. For instance, a color-coded heat map of application nodes or states generating particular errors is generated and an animated heat map is produced based on changes in error data over time. Additionally, plug-and-play testing of applications running on mobile devices is provided where a test resumes upon reconnection of the mobile device to the test processor, as discussed in further detail below.

Referring to FIG. 1, an embodiment of a system for modular continuous plug-and-play model driven software testing is shown. In the illustrated embodiment, a test processor 100 includes a plurality of input ports for connecting to mobile devices 102. In various embodiments, a mobile device 102 includes a tablet or a mobile phone running the software that is subject to the testing. Alternatively or in addition, the test processor 100 may connect to non-mobile devices, such as set-top boxes, including video streaming set top boxes, televisions, desktop computers, or other devices running the software subject to testing. In an embodiment, the software subject to testing is a video streaming software interface. The test processor 100 is a dedicated test computer executing an application that provides test inputs to software that is installed on each mobile device 102. Although FIG. 1 depicts a single test processor 100, those of skill in the art will realize that the test processor 100 may include a plurality of networked processors sharing the computing resources needed to perform testing of multiple devices 102. In one embodiment, the test processor 100 connects to each of the mobile devices 102 via a hardwired connection, such as via dedicated Universal Serial Bus (USB) ports, in order to communicate with each respective device's operating system. Alternatively or in addition, the test processor 102 may connect to each mobile device 102 via wired or wireless networked connection (e.g., via a LAN, WAN, or the Internet) or via a short-range wireless ad hoc connection, such as using a Bluetooth or Near Field Communication (NFC) based protocol. As discussed below, when the test processor 100 detects that a mobile device 102 has been connected thereto, it initiates the testing process by issuing a request to the application build server 104, for instance, via a network 106, to install the latest build of the application subject to testing onto the mobile device 102.

Figure 1A:
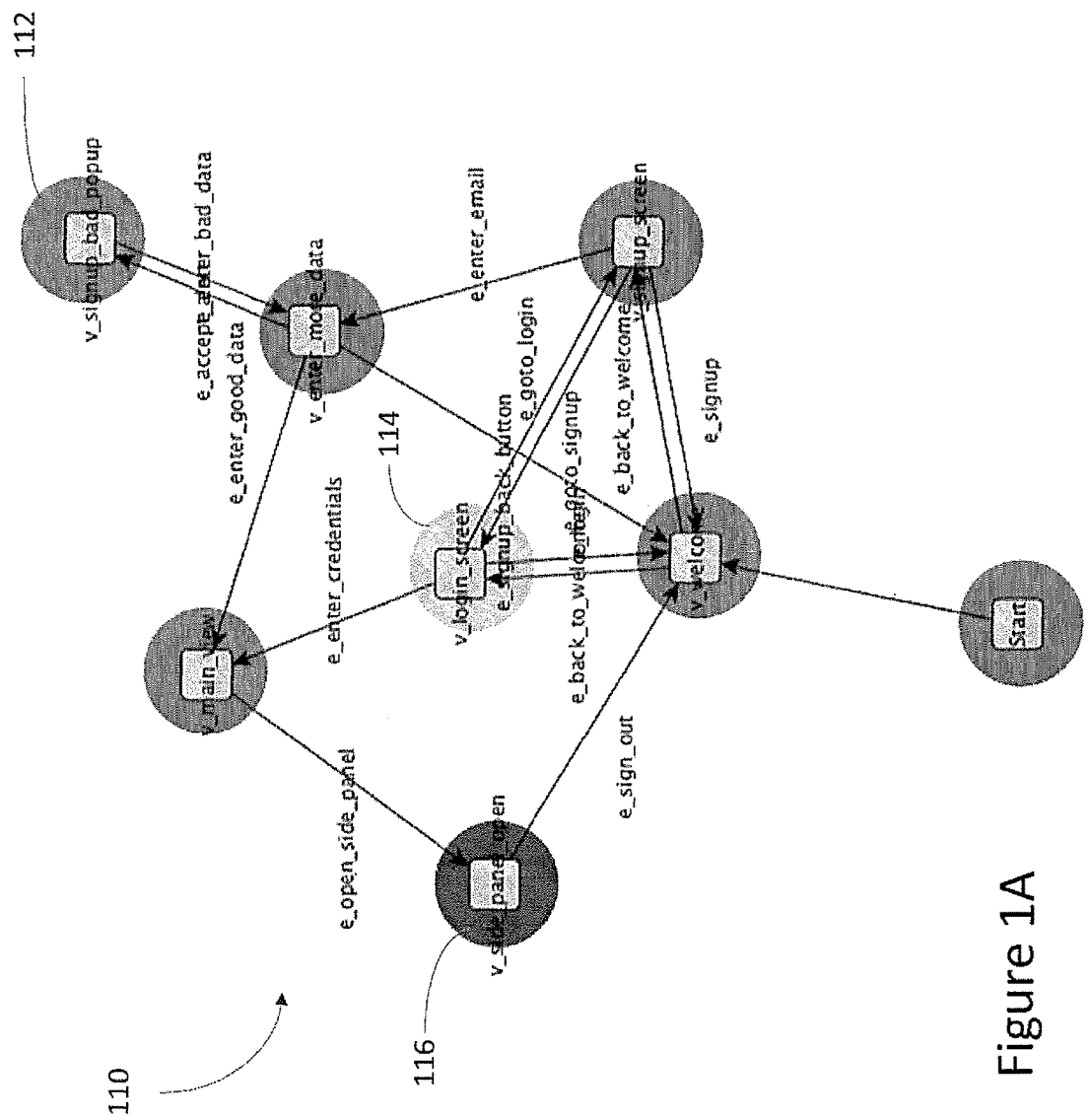
FIG. 1A is a diagram illustrating an embodiment of a heat map error graph produced by the test processor of FIG. 1.

Visualization workstations 108 provide visual status of the test progress, for instance by displaying a real-time error log associated with each connected device 102 as well as displaying a historical "heat map" style graph of errors, as shown in FIG. 1A. An embodiment of the heat map error graph 110 depicts a state graph for an application (similar to that described in detail in FIG. 2 below) where the application states or nodes are color coded by the amount of errors encountered at each node. For instance, a green node 112 indicates a low number of errors, while yellow and red color coded nodes 114, 116 respectively indicate an increasing numbers of errors for a given node. Error types may be listed by each node. In yet another embodiment, the visualization workstations 108 display an animated heat map style error graph using the changes in the error data collected over time.

Figure 2:
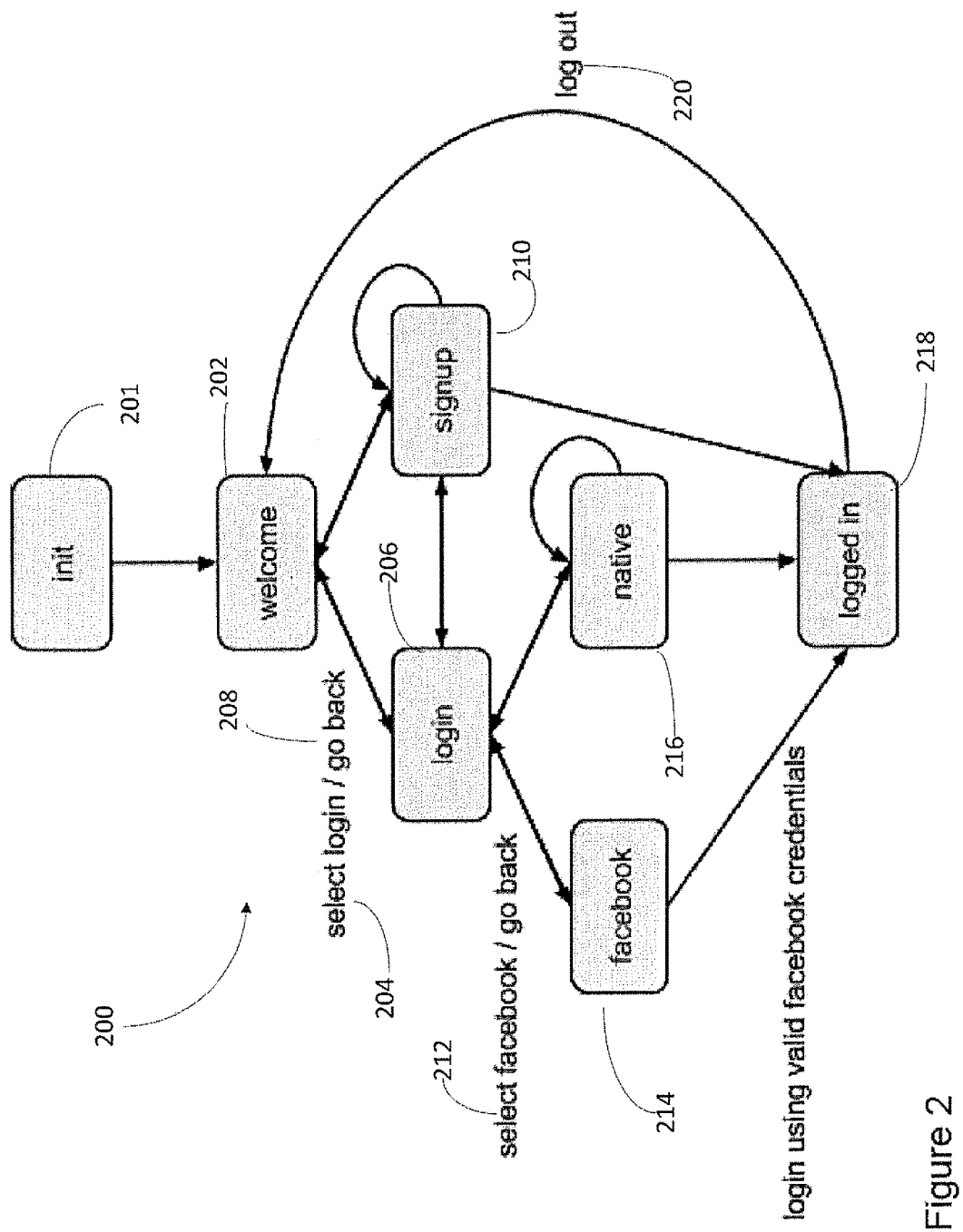
FIG. 2 is a diagram illustrating an embodiment of a state graph representing a login flow of an exemplary application under testing by the system of FIG. 1.

Referring to FIG. 2, an embodiment of a state graph or a model 200 representing a login flow of an exemplary application under testing is shown. In FIG. 2, the software application under testing has several states associated with the login process. In particular, once the login process is initiated (e.g., when a login input is received in the "init" state 201), the application under testing displays a welcome screen in state 202. There are several possible events (e.g., application inputs, such as user commands) that can be tested in welcome screen state 202. Namely, the application can receive a login input to move to the login state 204, the application can receive a go back command 208 to return to the welcome state 202, or receive a signup command (e.g., when a user selects a signup link or a similar input interface) to transition to the signup state 210. Similarly, each subsequent state in the state graph or model 200 includes one or more possible test events representing possible paths among the states depending upon various possible commands that can be received by the application and/or the device subject to the test. As such, from the login state 206, the user may issue a command 212 to select an interface that enables login via a social media account, such as Facebook (Facebook state 214) or proceed via the application's native login interface to state 216. Both native and social media login states 214, 216, as well as the signup state 210, progress the application flow to the logged in state 218, from which the user may issue a logout command 220 or proceed to issue a plurality of application specific inputs and commands, in which case the application model will progress to other states (not shown).

Therefore, as can be seen from the above login flow example of FIG. 2, an application flow has multiple decision points. Every node in the model 200 is a verifiable state in which the application can be. Every edge is an action or command that the user can carry out. The testing system of the present disclosure separates the testing code from the flow of the test. Every node and every edge is implemented as a function in the test implementation. A node includes several checks, such as whether a particular element can be found or particular text be seen, while an edge includes commands to manipulate the application or the device (for instance, click that button, enter this text into that field, do a three finger swipe from one set of coordinates to another set of coordinates on the device display screen). The graph or model 200 determines what actions are allowed to be carried out from a given state. Therefore, in one embodiment of the present disclosure, as the test processor 100 (FIG. 1) traverses the state graph or model 200, it decides on the fly which action to carry out. In an embodiment, when multiple commands or actions exist for a given state, the test processor 100 randomly selects one of the available action inputs. This has the desired effect of running different test scenarios without having to manually define a set of steps to take. The model driven approach is thus superior to the traditional linear method.

Figure 3:
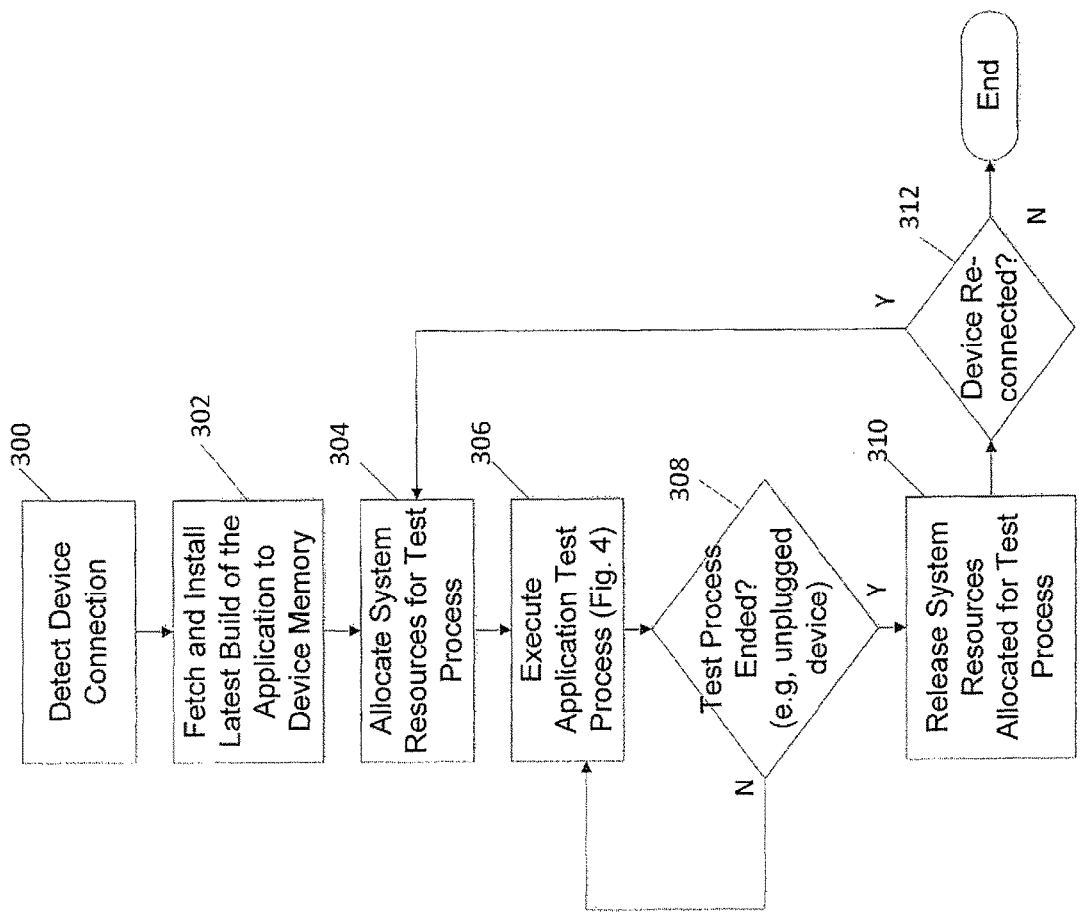
FIG. 3 is a flow chart illustrating an embodiment of a method for modular plug-and-play continuous model driven software testing.

Referring to FIG. 3, an embodiment of a method for modular plug-and-play continuous model driven software testing is shown. In step 300, the test processor 100 detects that a mobile device 102 has been connected, for example to the test processor's USB port or via a wireless connection as discussed above. Upon detection of the mobile device 102, the test processor 100 fetches and installs the latest build of the application (or application module) subject to testing onto the device memory, step 302. In one embodiment, the test processor 100 first detects whether a version of the application (or application module) subject to testing is already installed on the mobile device 102 and removes a prior version of the application before installing the latest build. In step 304, prior to initiating execution of the test process for the application, the test processor 100 allocates the necessary system resources, such as memory, CPU processing and port allocations. In step 306, the test processor 100 launches the device platform's (e.g., specific to the device's operating system) and corresponding application's test process or a test run. As discussed further in FIG. 4, the test run involves parsing a graph file representing a model of an application (or of one or more application modules) under testing for possible application states and executing commands from an implementation file to test the application output. In an embodiment, the test run executes continuously as long as the device is connected to the test processor 100 and no errors force the test process to be aborted, step 308. In step 310, when the test processor 100 detects that the test run has ended, for instance when the device 102 was unplugged from the test processor 100 by a user, it releases the system resources previously allocated for the test process execution and records the progress of the test run in a test log file. Alternatively or in addition, the test progress may be continuously recorded in the test log file and displayed via the visualization workstation 108 (FIG. 1). Upon re-connection of device 102 to the test processor 100, step 312, resources are re-allocated and the test run resumes from the application state that was being tested when the device was unplugged. This achieves modular testing by not requiring the test run to traverse the entire state model for the application at one time, as well as permits the use of the device 102 for non-testing purposes when needed, while resuming the test run during the device's idle period. In an embodiment, rather than resuming the test run from the application state that was being tested when the device was unplugged, the test processor 100 resumes the test run from a predetermined starting state, such as from the init state 201 (FIG. 2).

Figure 4:
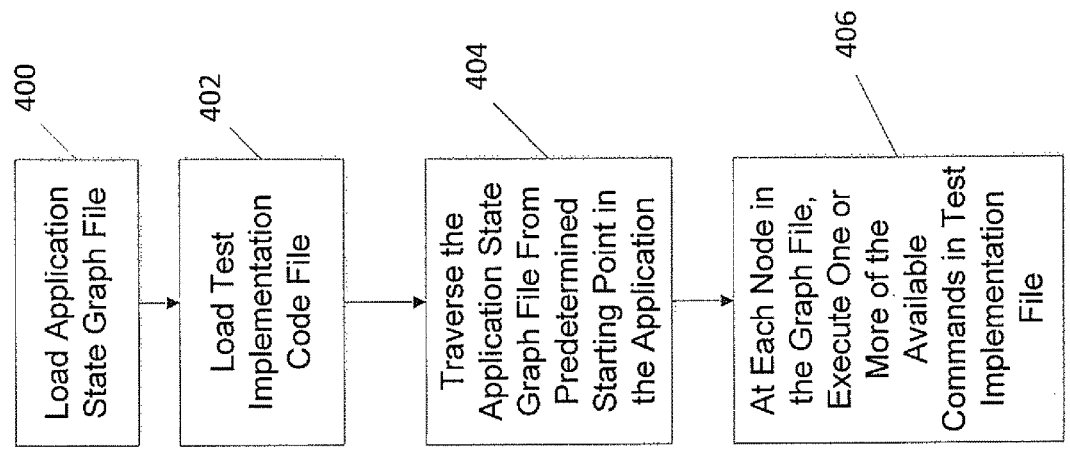
FIG. 4 is a flow chart illustrating an embodiment of a method for executing an application test process of FIG. 3 in further detail.

Referring to FIG. 4, an embodiment of a method for executing an application test process of FIG. 3, is shown in further detail. In step 400, the test processor 100 loads an application state graph file into a graph parsing component that traverses the graph file and triggers application commands corresponding the test implementation code. The test implementation code is loaded from a test implementation code file accessed by the test processor 100, step 402. In one embodiment, the graph file is an XML format file defining the nodes, or application states 202-218 (FIG. 2), where a given application state or node is associated with a set of possible actions or commands that can be issued to interact with the application under testing. When the test run first begins, in step 404, the test processor 100 traverses the graph file from a predetermined starting point, such as the init state 201 in FIG. 2, to execute the commands from the test implementation file. If the test run is resuming after the device 102 was unplugged, the test processor 100 resumes traversing the graph file either from the node which was being tested before a device disconnect event (e.g., based on the last node recorded in test progress log file) or again from the initial starting point, such as the init state 201 in FIG. 2. In step 406, for each node in the application model 200, the test processor 100 determines which of the set of corresponding commands from the test implementation code file to execute. In one embodiment, upon traversing the graph file to arrive at a given node, the test processor 100 randomly chooses among the available actions in the test implementation file. Over multiple test iterations, this results in a plurality of possible test cases as the graph file is traversed, further simplifying test case design and obviating the need for detailed test case design. In view of the randomization of application command inputs, the test processor 100 automatically covers the possible variations in test case scenarios. Alternatively or in addition, the test processor 100 accepts user input to assign weights to certain commands or command categories, for example to ensure that certain application functionality receives test run priority.

When an error has been identified, the processor 100 automatically logs and triages the error types, whereby it distinguishes among application errors as well as errors resulting from external factors. For instance, when the device 102 is disconnected (e.g., resulting in a USB port communication error) or if one of the third party applications throws an error, the test processor 100 assigns such errors a low priority because they are did not originate from the application under testing. Additionally, when an error is encountered, the test processor 100 checks an error log file to determine whether the error is related to a know issue. As such, errors associated with know issues may receive a priority lower than new errors, or vice versa depending upon desired configuration. High priority errors may be displayed more prominently and/or sorted at the top of an error log as displayed via the visualization workstation 108.

In an embodiment, the foregoing functionality of the system of the present disclosure may be coded using Python object oriented programming language. In such an embodiment, the test processor 100 parses the graph file via a graphwalker component written in Python, while a Selenium test automation framework may be used for testing Internet applications as a layer on top of an Apium interface for sending commands and reading output from physical devices 102.

Figure 5:
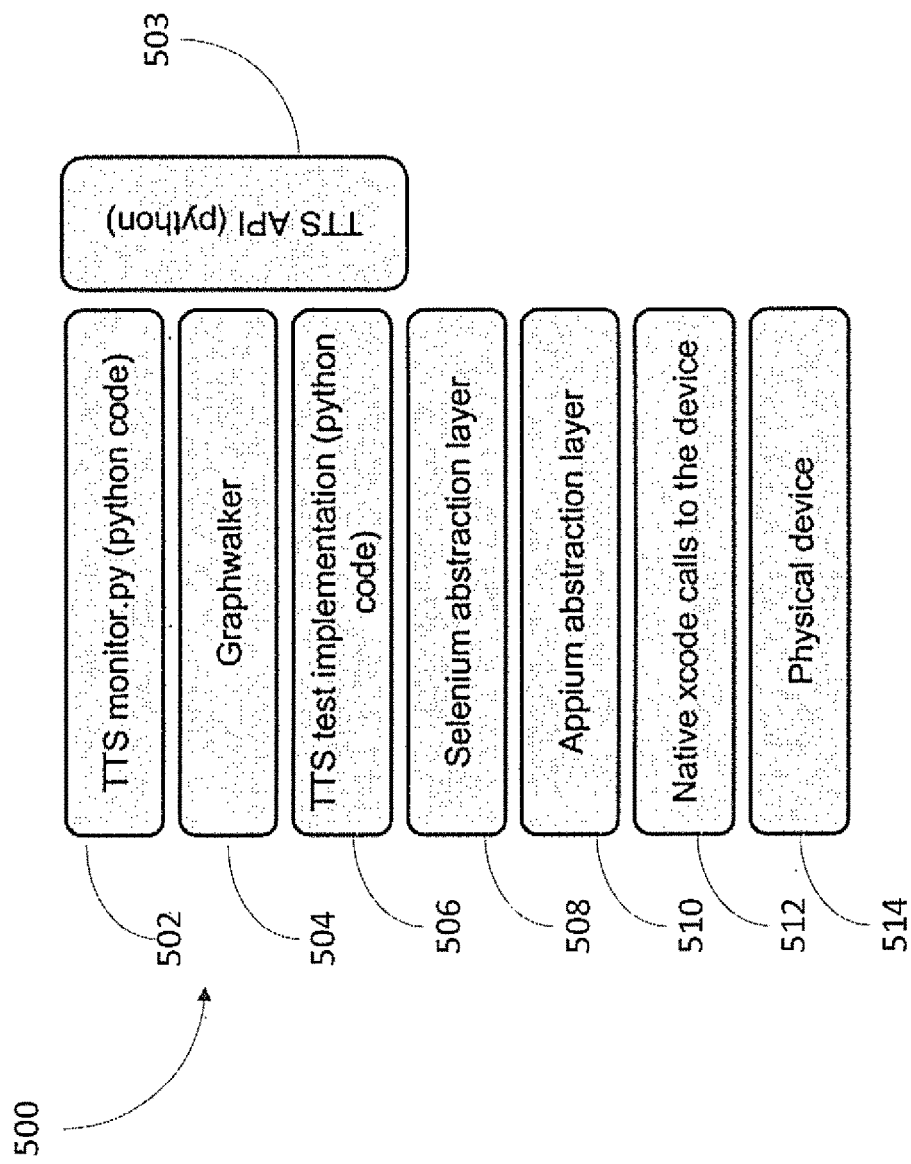
FIG. 5 is a diagram illustrating an embodiment of a technology stack of the test processor of FIG. 1 for testing an application running on a mobile device operating system.

Referring to FIG. 5, an embodiment of a technology stack 500 of the test processor 100 for testing an application running on a mobile device operating system (e.g., iOS) is shown. A testing system (TTS) monitor stack 502 runs at the top level and triggers the lower layers. Once the monitor 502 finds a connected device 102 it launches a graphwalker instance 504, which, in turn, spawns a TTS test run 506. Preferably, the TTS test run 506 employs a dedicated system process that is separate from the main testing system process, which permits the system to continue running in the event of test failure such as when the device 102 becomes disconnected. Both the monitor 502 and the TTS test run 506 use the TTS Application Programming Interface (API) 503. The TTS test run contains a selenium code abstraction layer 508, which then passes the calls through the Appium layer 510. The Appium layer 510 translates the Selenium calls to Native xcode calls for the layer 512 which communicates with the physical device layer 514. Data is then passed through the same layers, but in reverse all the way up to the TTS test run and then finally at the end and/or during the test, displayed on the monitor.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for testing an application running on an electronic device, the method comprising:
   parsing, by a test processor, a state model of the application representing relationships among a plurality of nodes, each node representing an application state;
   parsing, by the test processor, a test implementation file including a plurality of commands for manipulating at least one of the application and the electronic device, each of the plurality of commands associated with respective ones of the plurality of nodes;
   traversing, by the test processor, the state model of the application by selecting for testing an application node in accordance with the node relationships in the state model;
   selecting, by the test processor, one or more of the plurality of commands for testing the application based on at least one criterion;

executing, by the test processor, the one or more selected commands, and upon disconnection and reconnection of the electronic device with the test processor, (a) detecting, by the test processor, that a connection session with the electronic device was terminated, and (b) resuming, by the test processor, traversing of the state model of the application from one of a predetermined application node and an application node for which the one or more selected commands were executing prior to the detection.

2. The method of claim 1 wherein the at least one criteria is a random selection.

3. The method of claim 1 wherein the at least one criterion is a weight assigned to the one or more of the plurality of commands.

4. The method of claim 1 wherein the electronic device is selected from the group consisting of a mobile device, a mobile phone, a tablet computer, a computer, a set top box, and a television.

5. The method of claim 1 wherein the application is a video streaming interface.

6. The method of claim 1 further comprising generating a heat map graphical representation of application errors for each node in the state model.

7. The method of claim 1 further comprising assigning, by the test processor, a priority to an error based on maintaining a log of known errors.

8. The method of claim 1 wherein the electronic device is connected to the test processor via a wired connection or a wireless connection.

9. An apparatus for testing an application running on an electronic device comprising:

a test processor; and memory coupled to the test processor and having stored thereon computer readable instructions executed by the test processor, the instructions comprising:

parsing, by the test processor, a state model of the application representing relationships among a plurality of nodes, each node representing an application state;

parsing, by the test processor, a test implementation file including a plurality of commands for manipulating at least one of the application and the electronic device, each of the plurality of commands associated with respective ones of the plurality of nodes;

traversing, by the test processor, the state model of the application by selecting for testing an application node in accordance with the node relationships in the state model;

selecting, by the test processor, one or more of the plurality of commands for testing the application based on at least one criterion;

executing, by the test processor, the one or more selected commands; and upon disconnection and reconnection of the electronic device with the test processor, (a) detecting, by the test processor, that a connection session with the electronic device was terminated, and (b) resuming, by the test processor, traversing of the state model of the application, from one of a predetermined application node and an application node for which the one or more selected commands were executing prior to the detection.

10. The apparatus of claim 9 wherein the at least one criterion is a random selection.

11. The apparatus of claim 9 wherein the at least one criterion is a weight assigned to the one or more of the plurality of commands.

12. The apparatus of claim 9 wherein the electronic device is selected from the group consisting of a mobile device, a mobile phone, a tablet computer, a computer, a set top box, and a television.

13. The apparatus of claim 9 wherein the application is a video streaming interface.

14. The apparatus of claim 9 wherein the test processor generates a heat map graphical representation of application errors for each node in the state model.

15. The apparatus of claim 9 wherein the test processor assigns a priority to an error based on maintaining a log of known errors.

16. The apparatus of claim 9 wherein the electronic device is connected to the test processor via one of a wired connection and a wireless connection.

* * * * *